Figure 1:
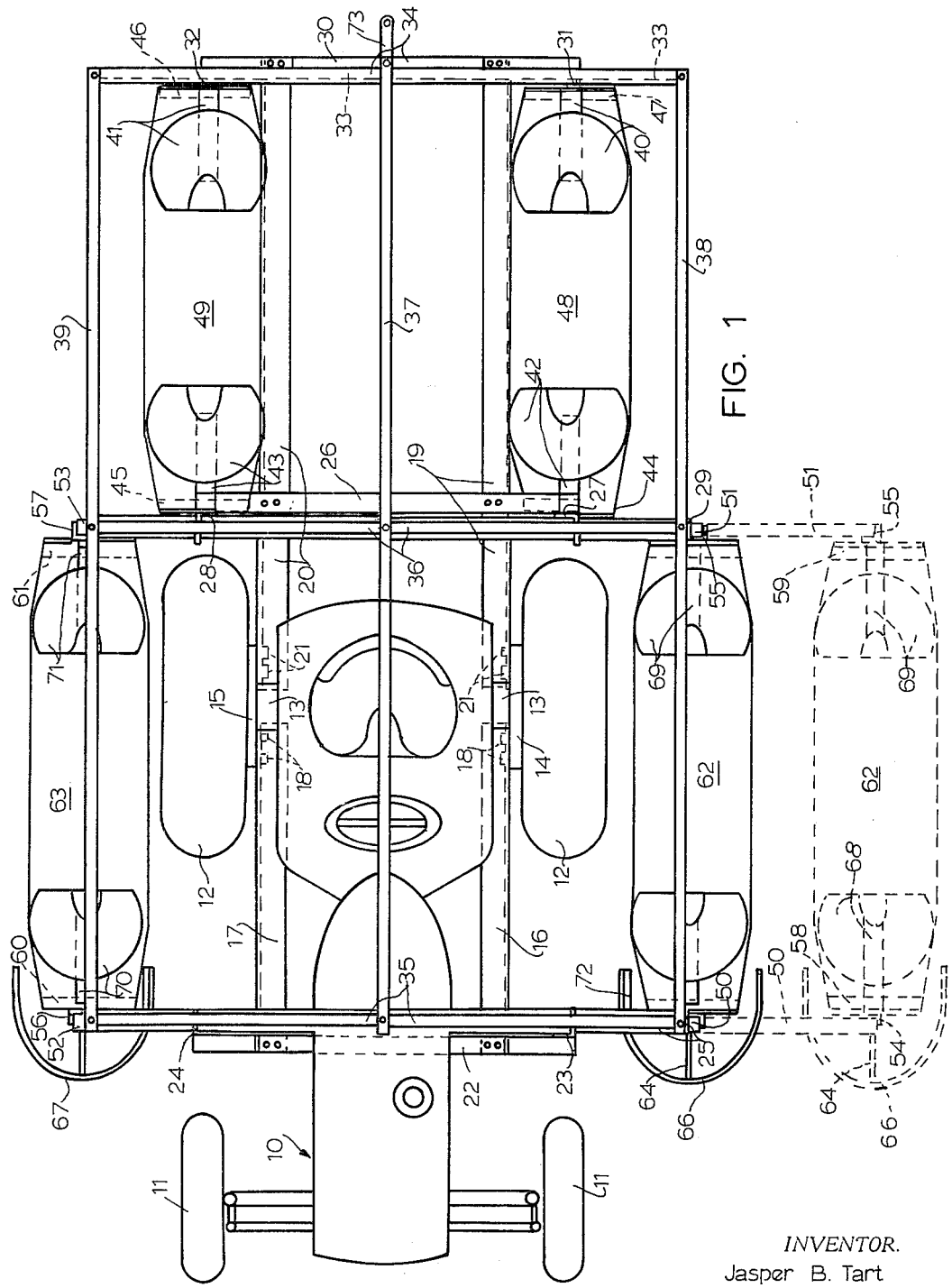

Dec. 14, 1965  J. B. TART  3,223,444
TOBACCO HARVESTER
Filed May 25, 1964  2 Sheets-Sheet 1

INVENTOR.
Jasper B. Tart

Dec. 14, 1965   J. B. TART   3,223,444
TOBACCO HARVESTER
Filed May 25, 1964   2 Sheets-Sheet 2

INVENTOR.
Jasper B. Tart

United States Patent Office 3,223,444
Patented Dec. 14, 1965

3,223,444
TOBACCO HARVESTER
Jasper B. Tart, Rte. 2, Dunn, N.C.
Filed May 25, 1964, Ser. No. 370,029
2 Claims. (Cl. 296—26)

This invention relates to agricultural implements and more particularly to tobacco harvesting devices used to assist and speed up the harvesting and preparing for curing of leaf crops such as tobacco.

In the past, various types of units have been devised to improve over the age old method of harvesting tobacco by individual workers walking down the rows of tobacco picking the leaves. In recent years, units have been developed to allow the farm hands to ride through the fields, harvesting the tobacco and preparing it for curing by tying the leaves on tobacco sticks. One such device is disclosed in the patent to Shaver 2,797,822. It has been discovered, however, that this device and similar units are extremely heavy and complicated and do not give good service and have even been known to completely breakdown the tractor on which they are mounted.

After much research and experimentation to the needs of the tobacco harvesting industry and into possible solutions of these needs, applicant has invented a new and improved tobacco harvesting device which incorporates the advantages of some of the prior art units while eliminating the disadvantages of the same, thereby developing a much superior unit to that which has been known before.

It is, therefore, an object of the present invention to provide a lightweight tobacco harvesting device which does not unbalance the carrying unit and also does not tend to damage or breakdown such units.

Another object of the present invention is to provide a unitary support beam below the superstructure of the tobacco harvesting device which gives the advantage of lower gravity center and much stronger overall unit without a weight penalty.

Another object of the present invention is to provide an adjustable unit which may be rigged in such a manner that in one position it is only slightly wider than the basic carrier or tractor while in other positions it may be adjusted to fit various widths of rows of crops, thereby giving the advantage of being easily transported while still retaining the feature of being adjustable to a wide position during actual operation.

A further object of the present invention to provide a compact tobacco harvesting unit without sacrificing any of the advantages of the larger rigs.

Another object of the present invention is to provide a tobacco harvester which is adaptable to pull a trailer upon which the tobacco which has been prepared for curing by tying onto sticks may be placed or for other uses and which may be pulled behind the tobacco harvester.

Another object of the present invention is to provide a tobacco harvesting device which eliminates complicated and time consuming attachment and detachment from the carrying unit or tractor and to provide a very simplified and easily attachable unit.

Another object of the present invention is to provide a simple breakdown method of detaching and attaching the various components of the tobacco harvester thereby allowing a single person in a short time to be able to adjust, remove, or attach the device of the present invention to a carrier or tractor.

A further object of the present invention is to provide a semi-cylindrical guard or shield around the forward portion of a tobacco harvesting device whereby the workers will be protected from rubbing against the crop being harvested and at the same time which prevents injury to the plants due to their becoming entangled in the tobacco harvesting unit.

Another object of the present invention is to provide a tobacco harvesting unit which is inexpensive to construct and maintain and yet retains all of the advantages of the more expensive and complicated units having the same or similar purposes.

Other objects and advantages of the present invention will become apparent and obvious from a study of the following description and the accompanying drawings which are merely illustrative of the present invention.

Figure 2:
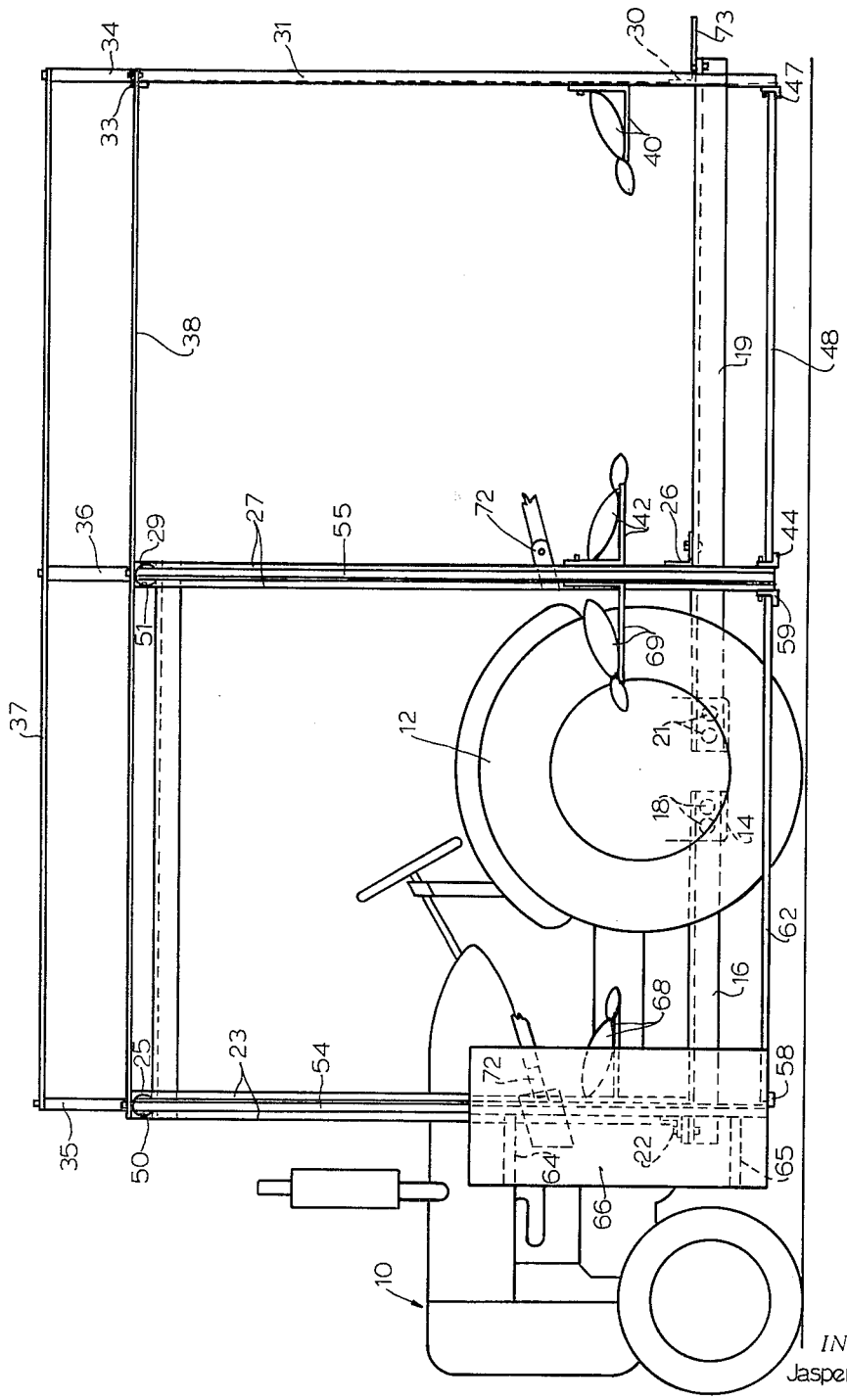

In the drawings:

FIG. 1 is a top plan view of the tobacco harvesting device incorporating the features and advantages of the present invention; and FIG. 2 is a side elevational view of the tobacco harvester disclosed in FIG. 1.

With further reference to the drawings, FIG. 1 discloses a top pan view of an improved tobacco harvesting device comprising a tractor 10 having front wheels 11 and rear wheels 12.

The rear wheels 12 are mounted on an axle 13 which includes brakedrum housings 14 and 15. Forward base support members 16 and 17, composed of angle iron or similar material, are detachably secured at their rear portions to the respective brake housings 14 and 15 by means such as by pairs of bolts 18.

A pair of rear base support members 19 and 20 are provided which are detachably secured to the respective brakedrums 14 and 15 by means such as pairs of bolts 21.

Detachably secured to the forward portion of the forward base support members 16 and 17 is a forward cross support member 22 in the form of an angle iron or similar configuration. Fixedly secured to said cross member are forward upright members 23 and 24.

Insertedly mounted through the upper portion of the forward upright members 23 and 24 is a forward carrying tube 25.

Detachably mounted on the forward intermediate portion of the rear base support members 19 and 20 is an intermediate cross support member 26. Fixedly attached to said cross support member 26, at either end thereof, are intermediate upright members 27 and 28. Insertedly secured to said upright members 27 and 28 in the upper portions thereof is a rear carrying tube 29.

Detachably secured at the rear portion of the rear base support members 19 and 29 is a rear cross support member 30. Fixedly secured to said cross support are rear upright members 31 and 32.

Detachably secured by any convenient means to the upper portion of the rear upright members 31 and 32 is an upper cross member 33.

Detachably secured to the end portions of cross member 33 is a canvas or roof supporting truss 34. Likewise, detachably secured to the end portions of the forward and rear carrying tubes are forward and intermediate trusses 35 and 36 respectively.

Detachably secured to the peak of the three trusses 34, 35, and 36 and paralleling the longitudinal axis of the harvester is a ridge support member 37.

Paralleling said ridge member and detachably secured to the end portions of truss members 34, 35, and 36 on their respective sides are eave support members 38 and 39.

Vertically adjustable seats and seat support members 40 and 41 are provided which are adjustably mounted on upright portions 31 and 32 respectively. Likewise, seat and seat support members 42 and 43 are provided which are vertically adjustable on intermediate members 27 and 28 respectively.

Detachably mounted on the bottom portion of each of the upright members 27, 28, 31 and 32 are floorboard support members 44, 45, 46 and 47 respectively. Removably mounted between support members 44 and 47 and between members 45 and 46 are floorboard members 48 and 49 respectively.

In addition to the superstructure already described, there is provided on either side of said structure, wing units which are so constructed as to be adjustable to and from the longitudinal axis of the basic carrier unit 10.

These wing units are composed of rod members 50 and 51 which are adapted to be slideably mounted within the forward carrying tube 25 and the rear carrying tube 29 respectively on one side of the superstructure. On the opposite side of the superstructure are provided rod members 52 and 53 which are similar to rod members 50 and 51 and are slideably mounted within the opposite end of tube members 25 and 29 respectively.

To the outwardly projecting end portions of the rod members 50 and 51, 52 and 53 are attached generally vertically disposed wing support members 54, 55, 56 and 57 respectively. Attached respectively to the lower end of each of the wing support members are floorboard support members 58, 59, 60 and 61. Removably mounted between support members 58 and 59 and between 60 and 61 are floorboard members 62 and 63 respectively.

Bracket members 64 and 65 are provided which are secured at one end to the wing support member 54 by any suitable means. The opposite ends of the brackets 64 and 65 are secured to a protective shield 66. The wing unit on the opposite side of the tractor 10 has brackets similar to brackets 64 and 65 which are secured to wing support member 56. Connected to these brackets is a shield 67. Vertically adjustable seats and seat support members 68, 69, 70 and 71 are mounted on wing support members 54, 55, 56 and 57 respectively. Conveniently provided adjacent the forward seat of each group as defined by the floorboards of the present invention are tobacco stick holders designated generally as 72.

Fixedly secured to the rear cross support member 30 is a trailer connection plate 73 which acts as a coupler between the tobacco harvester of the present invention and any other vehicle which the operator might desire to connect therebehind.

In actual use of the device of the present invention, the tractor may be used by the farmer all during the farming season up until it is time to actually harvest the crops. When the tobacco is ready for harvesting, all the farmer needs to do is to attach the harvester to the tractor (which may be done by one man in a relatively short time). To do this he will attach the four base support members 16, 17, 19 and 20 to the brakedrum housings 14 and 15 by any convenient means such as pairs of bolts 18 and 21. Next the forward, intermediate and rear cross support members 22, 26 and 30 respectively would be attached to the base supports. Next the upright members 23, 24, 27, 28, 31 and 32 would be attached in place. Then the forward and rear carrying tubes 25 and 29 would be inserted in the openings of the upper end of the forward and intermediate upright members. Following this assemblage, the seats and floorboards are placed in proper position and the seats adjusted to the height of the crop and to the size of the workers. Protective shields 66 and 67 are placed in proper position to guard the workers from becoming injured or irritated by rubbing against the crops as the unit moves through the fields. Also these protectors protect the crops which have not been harvested by eliminating sharp corners and other undesirable configurations which might rip, tear or in other wise injure the such crop. Finally, if it is so desired, the roof truss 34, 35, and 36, along with the ridge and eave supports 37, 38 and 39 respectively, may be added to support a roof composed of canvas or any other suitable material thereby furnishing shade and protection from the elements for the workers using the tobacco harvester.

As the tobacco harvester is stored or moved prior to the actual entering of a field for operation the wing units may be placed adjacent the tractor by sliding the rod members into the tube members. It should be noted that not just the seats and floorboards move inwardly but the whole superstructure which was projecting will move inwardly to a point adjacent the tractor, or conversely, the wing unit may be adjusted outwardly to any desired position, up to a predetermined maximum, so that the workers may be carried between the rows of plants while the tractor moves down the rows.

Once the tobacco picking or priming has been completed and the use of the tobacco harvester is not necessary, it is a very simple matter to dismount and remove the harvester from the tractor, so that said tractor may be used for other farm work, by simply taking the assembly process in reverse.

It is, of course obvious that great advantages are to be gained by the use of the present invention by itself or in conjunction with a trailer or other vehicle which may be attached to the rear of the harvester through means of trailer connection plate 73.

It is obvious that the present invention is a great improvement over the prior art in that it is light weight in construction yet more than adequately strong to accomplish the desired end results. By having unitary support beams beneath the rear platforms of the present invention, it is possible to have a much sturdier tobacco harvester than has heretofore been known and they also make possible the connection of a trailer or other trailing vehicle to the harvester. The present invention has the advantage of also being a narrow, compact unit when in completely folded position while having the advantages of the larger rigs when it is in expanded position. Due to its very simplified construction the tobacco harvester of the present invention is cheap to manufacture, is easy to assemble and disassemble, and is structurally as sound and reliable as any of the larger, bulkier, more complicated harvesters.

The terms, "upper," "lower," "forward," "reverse" etc. have been used herein merely for the convenience of the foregoing specification and in the appended claims to describe the tobacco harvester and its parts as oriented in the drawings. It is to be understood, however, that these terms are in no way limiting to the invention since the harvester may obviously be disposed in many different positions when in actual use.

The present invention, of course, may be carried out in other specific ways than those here and set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tobacco harvesting device comprising a tractor having sets of front and rear wheels, a brakedrum mounted on the inside of each of said rear wheels, a pair of forward base support members detachably mounted on said brakedrums and being disposed in a plane parallel to the longitudinal axis of said tractor and extending forward from said drums; a pair of rear base support members detachably mounted on said brakedrums and being disposed in a plane parallel to the longitudinal axis of said tractor and extending rearwardly from said drums, a forward cross support member mounted between said forward support members and perpendicular thereto, an intermediate cross member mounted between said rear base support members and perpendicular thereto, a pair of forward upright members secured to either end of said forward cross support member, a pair of intermediate upright members secured to either end of said intermediate cross support member, a forward carrying tube insertedly mounted in the upper portions of the forward upright members and being disposed parallel to said forward cross support member, a rear carrying tube insertedly mounted in the upper portion of said intermediate upright members and disposed parallel to said intermediate cross support member, rod members slideably mounted within each end of both the forward and rear carrying tubes, wing support members secured to each of said rod members and projecting downwardly therefrom, seat means adjustably mounted on each of said wing support members whereby field workers may be conveyed through a field while working, a rear cross support member detachably secured to the rear portion of the rear base support members and being disposed perpendicular thereto, a pair of vertically disposed rear upright members secured at their lower portions to either end of said rear cross support member, seat means adjustably mounted on each of said rear and intermediate upright members and a trailer connection plate secured to said rear cross support member whereby as tobacco is harvested it may be placed on a trailing vehicle behind the workers thereby facilitating and speeding up the work.

2. The harvester of claim 1 in which truss means are provided above each of said tube members and above said rear upright members, and a cover means for said truss means whereby the workers using the device may be protected from the elements.

References Cited by the Examiner
UNITED STATES PATENTS

| | | | |
|---|---|---|---|
| 2,518,965 | 8/1950 | Whitley | 214—83.1 X |
| 2,564,800 | 8/1951 | Bates | 296—78.1 |
| 2,732,961 | 1/1956 | McIver | 214—5.5 |
| 2,788,141 | 4/1957 | Hendrix | 214—83.1 |
| 2,797,822 | 7/1957 | Shaver | 214—83.1 X |
| 3,109,273 | 11/1963 | Soldner | 56—190 |

GERALD M. FORLENZA, *Primary Examiner.*